United States Patent
Nicholson

(10) Patent No.: US 10,132,153 B2
(45) Date of Patent: Nov. 20, 2018

(54) SYSTEM AND METHOD FOR TREATING PRODUCED WATER HAVING A FLASH VAPORIZATION SYSTEM FOR REMOVING DISSOLVED GASES FROM PRODUCED WATER

(71) Applicant: VEOLIA WATER TECHNOLOGIES, INC., Moon Township, PA (US)

(72) Inventor: Mark C. Nicholson, Pewaukee, WI (US)

(73) Assignee: Veolia Water Technologies, Inc., Moon Township, PA (US)

( * ) Notice: Subject to any disclaimer, the term of this patent is extended or adjusted under 35 U.S.C. 154(b) by 319 days.

(21) Appl. No.: 14/829,742

(22) Filed: Aug. 19, 2015

(65) Prior Publication Data
US 2016/0053601 A1   Feb. 25, 2016

Related U.S. Application Data

(60) Provisional application No. 62/039,595, filed on Aug. 20, 2014.

(51) Int. Cl.
| | |
|---|---|
| B01D 17/02 | (2006.01) |
| C02F 1/04 | (2006.01) |
| E21B 43/40 | (2006.01) |
| C02F 1/20 | (2006.01) |
| C02F 1/06 | (2006.01) |
| E21B 43/24 | (2006.01) |
| B01D 17/06 | (2006.01) |

(Continued)

(52) U.S. Cl.
CPC .............. *E21B 43/40* (2013.01); *B01D 17/02* (2013.01); *B01D 17/06* (2013.01); *C02F 1/048* (2013.01); *C02F 1/06* (2013.01); *C02F 1/20* (2013.01); *C02F 1/40* (2013.01); *E21B 43/2406* (2013.01); *C02F 2103/10* (2013.01); *C02F 2103/365* (2013.01)

(58) Field of Classification Search
CPC ..... E21B 43/40; E21B 43/2406; B01D 17/02; B01D 17/06; C02F 1/048; C02F 1/06; C02F 1/20; C02F 103/102
See application file for complete search history.

(56) References Cited

U.S. PATENT DOCUMENTS

| | | | | |
|---|---|---|---|---|
| 3,353,593 | A * | 11/1967 | Boberg | C09K 8/592 |
| | | | | 166/252.1 |
| 7,438,129 | B2 * | 10/2008 | Heins | C02F 1/04 |
| | | | | 159/24.1 |

(Continued)

FOREIGN PATENT DOCUMENTS

WO   2012068590 A1   5/2012

*Primary Examiner* — David J Bagnell
*Assistant Examiner* — Yanick A Akaragwe
(74) *Attorney, Agent, or Firm* — Coats & Bennett, PLLC

(57) ABSTRACT

An oil recovery process includes recovering an oil-water mixture from an oil-bearing formation and separating the produced water from the oil-water mixture. The produced water includes dissolved gases and the method includes heating and pressurizing the produced water. After the produced water is heated and pressurized, it is flash vaporized through a lesser pressure which produces a vapor and residual produced water. The flash vaporization of the produced water evaporates dissolved gases and the dissolved gases are vented away with the vapor.

20 Claims, 5 Drawing Sheets

(51) Int. Cl.
*C02F 1/40* (2006.01)
*C02F 103/10* (2006.01)
*C02F 103/36* (2006.01)

(56) References Cited

U.S. PATENT DOCUMENTS

2011/0214623 A1 9/2011 Choi et al.
2012/0037097 A1* 2/2012 Schroeder ............... F22D 1/003
122/1 C

* cited by examiner

SYSTEM AND METHOD FOR TREATING PRODUCED WATER HAVING A FLASH VAPORIZATION SYSTEM FOR REMOVING DISSOLVED GASES FROM PRODUCED WATER

This application claims priority under 35 U.S.C. § 119(e) from the following U.S. provisional application: Application Ser. No. 62/039,595 filed on Aug. 20, 2014. That application is incorporated in its entirety by reference herein.

FIELD OF THE INVENTION

The present invention relates to a method for recovering oil and treating produced water, and more particularly to a system and method for removing dissolved gases from the produced water.

BACKGROUND OF THE INVENTION

In recent years, steam assisted gravity drainage (SAGD) processes have utilized evaporators to treat and evaporate produced water. In a typical process, the evaporators produce a concentrated brine and steam. Steam is condensed to form a distillate and the distillate is directed to a steam generator that generates steam. The generated steam is injected into an oil-bearing formation which facilitates the removal of oil from the oil-bearing formation. One of the common problems encountered in SAGD processes, and other industrial wastewater treatment processes, is the corrosion that is caused in process equipment by dissolved gases in produced water in the case of a SAGD process and in feedwater in the case of other industrial wastewater treatment processes. More particularly, in SAGD processes that utilize evaporators, non-condensable gases, such as oxygen and carbon dioxide, can contribute to corrosion of the heat transfer surfaces in the evaporator. In particular, oxygen corrosion produces general corrosion, crevice corrosion, and pitting and it is known that the rate of corrosion is directly related to the dissolved oxygen concentration in the feedwater. Besides oxygen, other dissolved gases are problematic also. Carbon dioxide and hydrogen sulfide also release gaseous products that form corrosion on process equipment, especially at high pressures and temperatures. For example, dissolved carbon dioxide combines with water to form carbonic acid that causes corrosion of process equipment.

SUMMARY OF THE INVENTION

The present invention relates to a method for removing an oil-water mixture from an oil well. After removing the oil-water mixture, the method entails separating the oil-water mixture into an oil product and produced water having dissolved gases. The produced water is heated and/or maintained above the operating temperature and pressure of the downstream deaerator or flash vessel to prevent the produced water from boiling. Upon entry into the deaerator or flash vessel, the produced water is flash vaporized to a lower pressure, resulting in the production of a vapor and residual produced water. The flash vaporization of the produced water causes dissolved gases in the produced water to be liberated and vented with the vapor from a deaerator or flash vessel. Thereafter, the residual produced water is directed to an evaporator which evaporates at least a portion of the produced water, producing a concentrated brine and steam. The steam is condensed to form a distillate, which is directed to a steam generator. In the steam generator, the distillate is heated to produce steam that is injected into an injection well.

In another embodiment, the temperature and pressure of the produced water is increased upstream of a deaerator. The temperature and pressure of the produced water upstream of the deaerator exceeds the temperature and pressure of the produced water inside the deaerator. The method entails flashing a portion of the produced water in the deaerator to remove dissolved gases from the produced water. In this embodiment, flashing a portion of the produced water results in the production of vapor and residual produced water in the deaerator. Flashing the produced water results in dissolved gases being liberated from the produced water and vented with the vapor out of the deaerator.

While it is commonly advantageous to operate the deaerator or flash vessel at or near atmospheric pressure, the flash vessel can be operated in a vacuum condition or a pressurized condition. The requirement for the incoming produced water feed is that it is maintained pressurized and at a temperature which is higher than the saturated temperature and pressure of the operating deaerator/flash vessel.

Other objects and advantages of the present invention will become apparent and obvious from a study of the following description and the accompanying drawings which are merely illustrative of such invention.

DESCRIPTION OF EXEMPLARY EMBODIMENT

The process disclosed herein is a process for recovering oil, particularly heavy oil such as recovered by SAGD processes, from oil wells and oil-bearing formations. Heavy oil is typically removed by injecting steam into oil-bearing underground formations. Steam heats the oil in the oil-bearing formation and in the process the steam condenses. This produces an oil-water mixture. The oil-water mixture is pumped to the surface. An oil-water separation process follows where oil is separated from the mixture. This leaves what is referred to as produced water. The produced water is reused to generate steam that is directed back into the oil-bearing formation.

Before the produced water can be reused to generate steam, it is treated. This is because produced water often includes dissolved gases, suspended solids and dissolved solids. Dissolved gases, such as oxygen and carbon dioxide, are problematic because, as discussed above, they tend to cause corrosion problems. This is a particularly troubling problem in cases where evaporators are used to evaporate produced water. At high temperatures and pressures, dissolved carbon dioxide combines with metal and forms carbonic acid, which also causes corrosion on surfaces of metal. Oxygen, in the presence of chlorides, can cause localized corrosion in the form of pitting and crevice corrosion, especially at high temperatures found in evaporators. Thus, as discussed below, the present invention provides a novel system and process for removing dissolved gases, such as oxygen and carbon dioxide, from the produced water before the produced water encounters an evaporator that is used to evaporate the produced water. The process described herein aims to avoid significant corrosion of process equipment, especially corrosion of the evaporator. As discussed below, the process of the present invention entails a flash vaporization process that occurs upstream of the evaporator and which produces a vapor and residual produced water. The flash vaporization of the produced water causes dissolved gases, such as oxygen and carbon dioxide, to be liberated from the produced water such that they are vented from a deaerator along with the resulting vapor from the flash vaporization process.

Figure 1:
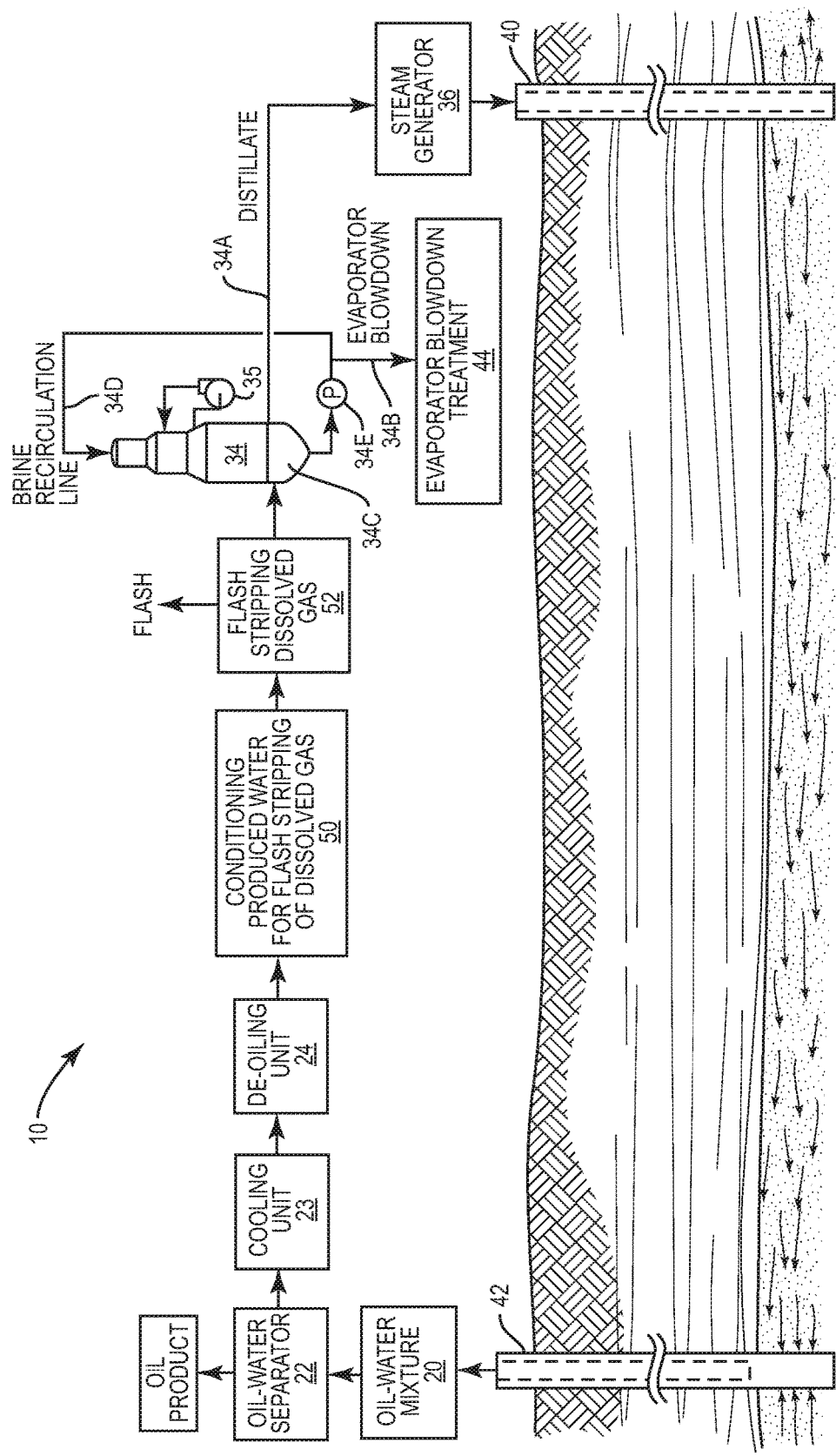
FIG. 1 is a schematic illustration of an oil recovery process that employs flash vaporization to remove dissolved gases from the produced water upstream of an evaporator.

With reference to FIG. 1, there is shown therein an oil recovery system and process that is indicated generally by the numeral 10. An oil-water mixture 20 is collected from the oil well 42 and pumped to the surface. The oil-water mixture is directed to an oil-water separator 22. This is generally referred to as a primary oil-water separation process. Various conventional oil-water separation systems can be employed. For example, gravity or centrifugal separators can be used to separate the oil-water mixture to yield an oil product and separated water. The oil product is further treated and sold. Typically the produced water has a temperature of approximately 160 to 180° C. To cool the produced water before further processing, the produced water is directed into a cooling unit 23 where the temperature of the produced water is typically reduced to approximately 85° C. In this way, the de-oiling unit 24 can be operated as tanks and not pressure vessels. After the produced water is cooled, it is directed to a de-oiling unit 24 where additional oil is removed. Various de-oiling devices, such as an induced gas flotation system, can be used. In some instances, a de-oiling polymer is added to the water separated by the oil-water separator 22. The output or effluent from the de-oiling unit 24 is referred to as produced water. It is this produced water that is treated and conditioned before being reused to generate steam.

The present invention entails a system and a process for removing dissolved gases from the produced water. As depicted in FIG. 1, the produced water from the de-oiling unit 24 is directed to a conditioning unit 50 that conditions the produced water for flash stripping of dissolves gases. From the conditioning unit 50, the produced water is directed to a flash stripping unit 52 that functions to flash strip dissolves gas from the produced water. Units 50 and 52 work together to remove dissolved gases, such as oxygen and carbon dioxide, from the produced water before reaching downstream process equipment, such as an evaporator. As will be discussed hereafter, the conditioning unit 50 cooperates with the flash vaporization unit 52 to cause the produced water to flash and emit vapor. Emitted with the vapor are dissolved gases from the produced water that are vented from the flash vaporization unit 52.

More particularly, the produced water conditioning unit 50 can be used to heat and pressurize the produced water. In one embodiment, the conditioning unit 50 includes an indirect heat exchanger that raises the temperature of the produced water above 100° C. In one embodiment, the temperature of the produced water is raised to approximately 110° C. Conceptually the vapor pressure in the deaerator or flash stripping unit 52 is controlled. The temperature of the produced water upstream of the deaerator unit 52 is maintained higher than the saturated vapor temperature of the produced water in the deaerator or flash stripping unit 52. This results in conditions in the deaerator or flash stripping unit 52 that will allow the produced water to flash. Also, the conditioning unit 50 pressurizes the produced water such that the produced water does not boil at the heated temperature.

Pressurized produced water having a temperature in excess of the saturated vapor temperature of the operating flash vaporization unit is directed to the produced water flash vaporization unit 52. Flash vaporization unit 52 typically comprises a deaerator or other device, such as a vessel, for receiving the produced water and containing the produced water while dissolved gases are flash stripped therefrom. Thus, the term "deaerator" is a broad term that means any structure or vessel for containing or holding the produced water while dissolved gases are being removed.

Flash vaporization unit 52 is operated at a lower pressure and corresponding saturated temperature relative to the pressure and temperature of the produced water in the conditioning unit 50. Thus, when the produced water reaches the flash vaporization unit 52, the produced water is flash vaporized to a pressure and temperature less than the pressure of the produced water in the conditioning unit 50. This results in the production of vapor and residual produced water. The reduction in both pressure and temperature relative to the temperature and pressure in the conditioning unit 50 means that dissolved gases in the produced water are liberated along with the vapor. Dissolved gases, as well as the vapor, are vented from the flash vaporization unit 52. Continuing to refer to the embodiment of FIG. 1, the temperature and pressure for conditioning the produced water and the flash stripping of the dissolved gases can vary. Assuming the flash stripping process that takes place in unit 52 is at or near atmospheric pressure, the temperature of the produced water is raised to 110° C. or higher in unit 50. The produced water is pressurized such that flashing does not occur until the produced water is allowed into unit 50. After conditioning the produced water in unit 50, the produced water is fed to unit 52 where the produced water is flash vaporized to a saturated temperature corresponding to the operating pressure of unit 50. The saturated temperature of the produced water in unit 50 is less than the temperature of the water coming from unit 52.

Downstream of the flash vaporization unit 52 is an evaporator 34. In some cases, a produced water treatment unit may be located downstream of the vaporization unit 52 and upstream of the evaporator 34. Such treatment units may be employed to remove suspended solids and/or dissolved solids such as hardness and silica. In order to address capacity, there may be provided a series of evaporators. In any event, the flashed produced water in the flash vaporization unit 50 is pumped into the evaporator 34. Evaporator 34 evaporates at least a portion of the produced water and, in the process, produces steam and a concentrated brine. The steam condenses to form a distillate 34A. Concentrated brine is collected in the sump 34C of the evaporator 34 and recirculated through the evaporator 34 by a pump 34E that pumps the concentrated brine through brine recirculation line 34D. A portion of the concentrated brine is directed as evaporator blowdown through line 34B to an evaporator blowdown treatment unit 44.

Evaporator distillate 34A is substantially pure. There may be a small amount of dissolved solids, on the order of 10 mg/L or less, in the distillate 34A. In any event, distillate 34A can be routed through the conditioning unit 50 where the heat energy associated therewith is transferred to the produced water passing through the conditioning unit 50. In the embodiment shown in FIG. 1, the distillate 34A is directed to a steam generator 36 where the distillate is converted to steam. Various types of steam generators can be employed. For example, the steam generator 36 may include a conventional boiler or packaged boiler. Moreover, the steam generator 36 may be a once-through steam generator (OTSG) that is employed with a steam-water separator for separating steam from a steam-water mixture produced by the OTSG. Steam generator 36 produces steam that is directed from the steam generator to an injection well 40. In the embodiment illustrated, the injection well 40 is spaced from the oil well 42 that actually produces the oil-water mixture 20. In conventional fashion, steam injected into the injection well 40 migrates horizontally to an area around the oil well 42 where the steam engages the oil in the oil well or oil-bearing formation and condenses to reduce the viscosity of the oil and generally mobilize the oil to produce the oil-water mixture 20 referred to above.

Evaporator 34, shown in FIG. 1, may be of various types. For example, the evaporator 34 may be a vertical falling film evaporator, a forced circulation evaporator, a horizontal evaporator or a rising film evaporator. In the case of a vertical falling film evaporator, the same includes an array of vertical tubes, the sump 34C for collecting and holding concentrated brine, a recirculating line 34D leading from the sump to an upper portion of the evaporator for discharging brine into the upper ends of the vertical tubes and a pump 34E disposed in the recirculating brine line for pumping brine from the sump to the upper portion of the evaporator where the brine is discharged into the tubes. When the brine is discharged into the upper ends of the tubes, the brine forms a thin brine film that falls down along the inside surfaces of the tubes. The tubes are heated, resulting in a portion of the brine vaporizing and forming a vapor, and in the process the brine is concentrated and falls into the sump 34C. Evaporator 34, in this example, is a mechanical vapor recompression (MVR) evaporator. The produced vapor is received by a compressor 35 and compressed, producing steam which is directed against the outside of the tubes, again heating the thin film of brine falling downwardly along the inside surfaces of the tubes. The steam condenses and produces the distillate 34A that is directed to the steam generator 36. A small portion of the concentrated brine is wasted as evaporator blowdown 34B.

Figure 2:
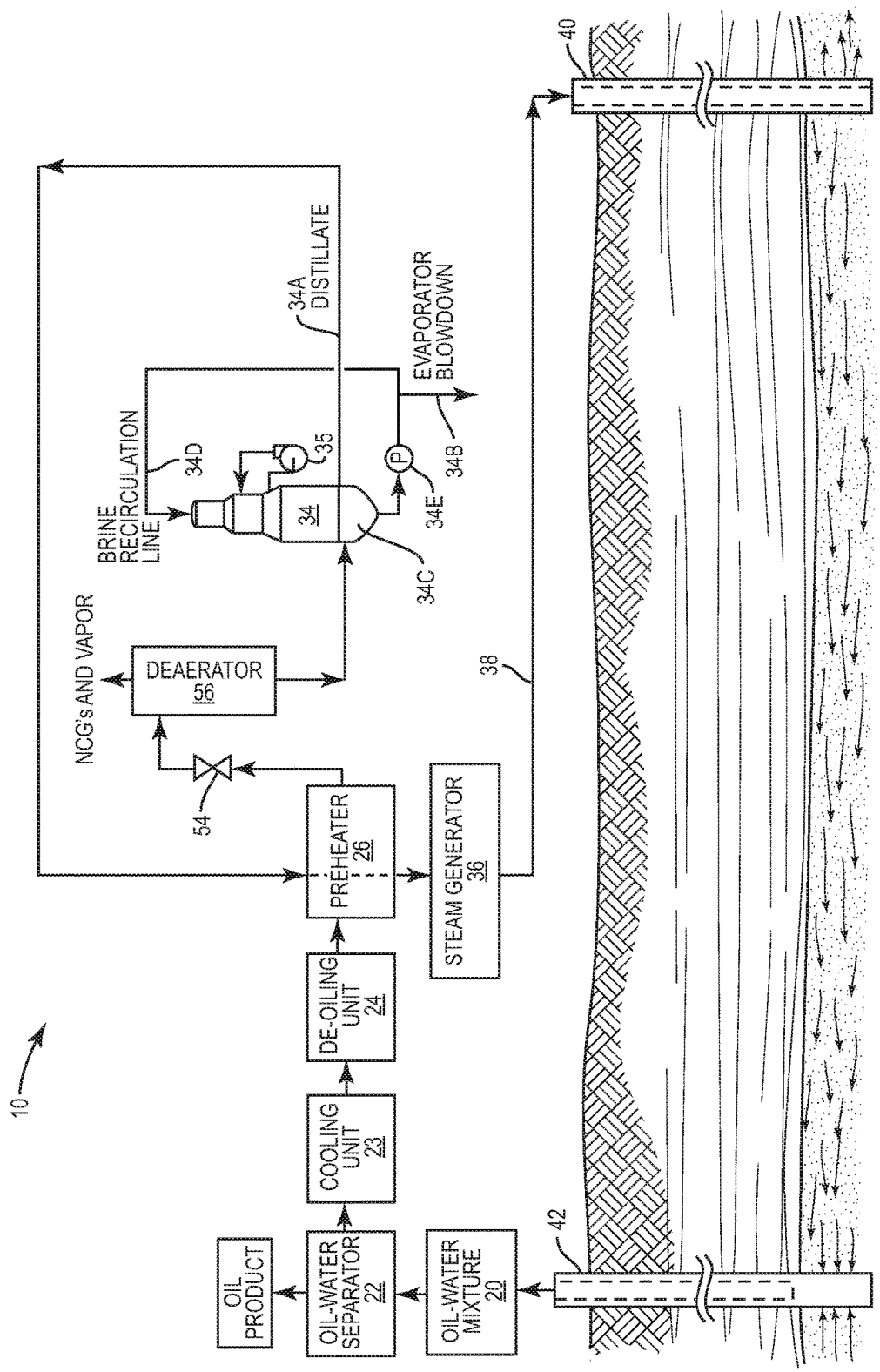
FIG. 2 is an alternative view of an oil recovery process that employs flash vaporization to remove dissolved gases from the produced water.

Now turning to the FIG. 2 embodiment, produced water is directed from the de-oiling unit 24 to the preheater or heat exchanger 26. The produced water is heated in the preheater 26. Heat is supplied by the distillate 34A produced by the evaporator 34. Note in FIG. 2 where the distillate 34A is pumped from the evaporator to the preheater or heat exchanger 26 and from there the distillate is directed to the steam generator 36. As the distillate 34A passes through the preheater or heat exchanger 26, heat is transferred from the distillate to the produced water. In a typical example, the distillate enters the preheater 26 at approximately 115° C. and exits at a temperature of approximately 85° C. The produced water, on the other hand, enters the preheater 26, in a typical example, at approximately 80° C. The heat exchanger or preheater 26 is designed to transfer sufficient heat from the distillate 34A to raise the temperature of the produced water to approximately 110° C. in one example.

Thus, in this example, the produced water exiting the preheater 26 is at a temperature of approximately 110° C.

Produced water in preheater 26 is pressurized sufficiently such that at 110° C. the produced water does not boil. To pressurize the produced water exiting the preheater 26 and to control the pressure of the produced water, there is provided a pressure control valve 54 downstream of the preheater. Pressure control valve 54 is disposed upstream of a deaerator 56. Thus, as seen in FIG. 2, pressure control valve 54 is disposed between the preheater 26 and the deaerator 56 where the flash stripping of dissolved gases occurs. Alternatively, a restriction orifice could be used instead of the control valve. The intent of either device is to prevent flashing of the produced water prior to entry into the deaerator/flash vessel 56.

In one example, the pressure control valve 54 controls the pressure of the produced water upstream of the valve. Deaerator 56 is at a relatively lower pressure compared to the pressure in the line between the preheater 26 and pressure control valve 54. Because the temperature and pressure upstream of the pressure control valve 54 is relatively high, it follows that the produced water exiting the pressure control valve 54 and entering the deaerator 56 is flash vaporized to the operating pressure and corresponding saturated temperature of the deaerator 56. Flash vaporization of the produced water in the deaerator 56 produces vapor and, at the same time, dissolved gases or non-condensable gases (NCG) such as oxygen and carbon dioxide are liberated with the vapor. Both the vapor and the liberated dissolved gases are vented from the deaerator 56. This means that residual produced water in the deaerator is substantially free of dissolved gases. This residual produced water is directed from the deaerator 56 into the evaporator 34 and the process continues as described above.

Figure 3:
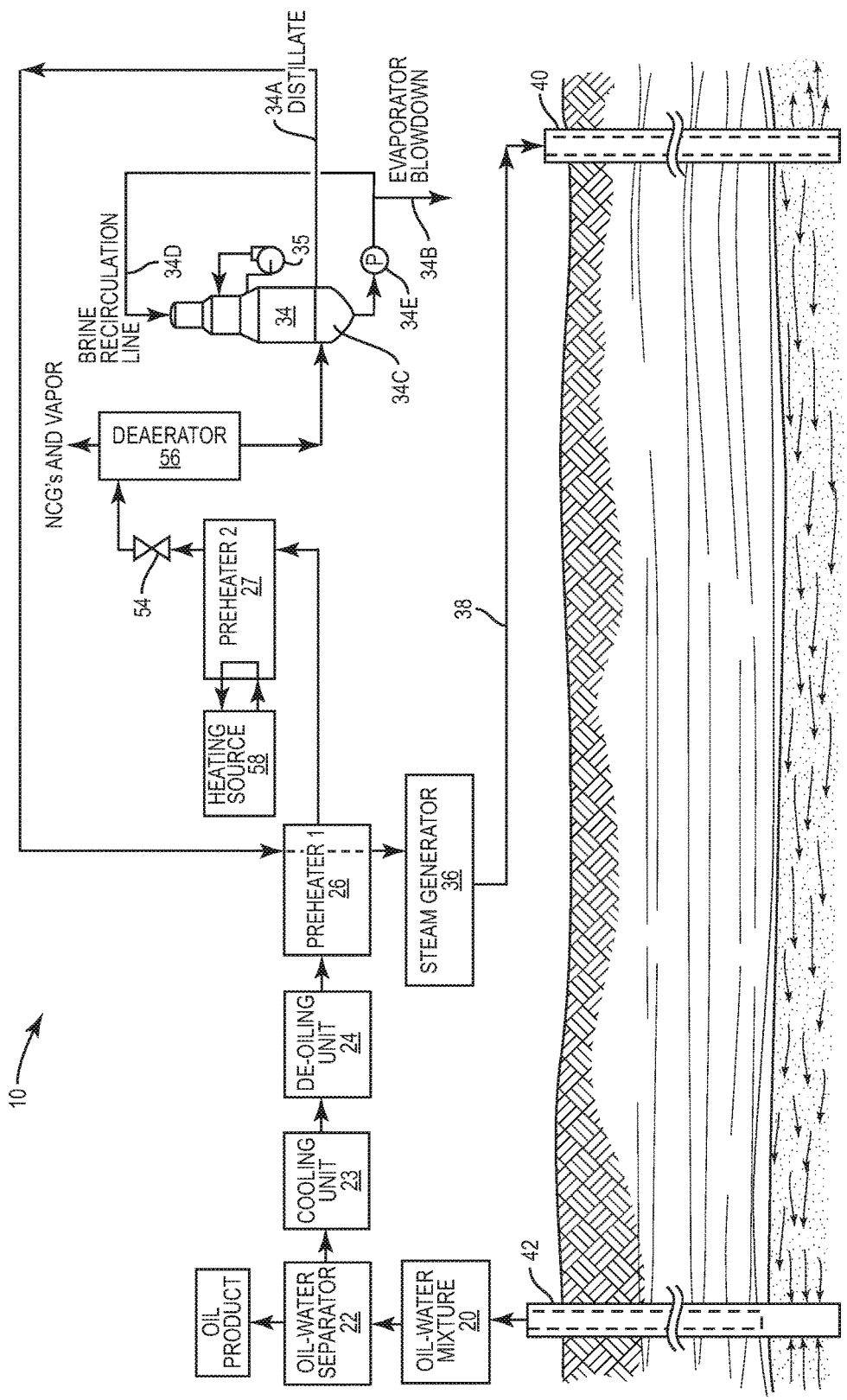
FIG. 3 is yet another alternative view of an oil recovery process where the produced water undergoes flash vaporization in order to liberate dissolved gases from the produced water.

Shown in FIG. 3 is another embodiment of the present invention wherein dissolved gases in the produced water are removed through flash stripping. The embodiment shown in the FIG. 3 is similar in many respects to that shown in FIG. 2 and described above. However, in the FIG. 3 embodiment, there is provided two preheaters or heat exchangers, preheater 26 and preheater 27. Preheaters 26 and 27 are disposed in series. The first preheater, preheater 26, is heats the produced water by utilizing distillate 34A, while the second preheater or heat exchanger 27 heats the produced water by a heating source 58. Various heating sources can be employed. Two examples of external heating mediums that can be used in the second preheater 27 is live steam or glycol.

Effectively, the heating process in the FIG. 3 embodiment is a stepped or staged heating process. First, the produced water is heated in the first preheater 26. In one example, the distillate 34A enters preheater 26 at approximately 115° C. and exits at approximately 85° C. The produced water, on the other hand in a typical example, enters the preheater 26 at a temperature of approximately 80° C. and exits the preheater at a temperature of approximately 108° C. Thus, the produced water enters the second preheater 27 at a temperature of approximately 108° C. The system and process is designed such that the produced water exiting the second preheater 27 is at a temperature of 110° C. or greater. As is the case with the FIG. 2 embodiment, the pressure control valve 54 disposed downstream of the second preheater 27 is operative to pressurize the produced water upstream of the pressure control valve. As the produced water exits the pressure control valve 54, the produced water enters the deaerator 56 and is flash vaporized to an operating pressure and corresponding saturated temperature less than the pressure and temperature upstream of the pressure control valve 54. This, like the exemplary embodiment of FIG. 2, causes a portion of the produced water to vaporize and in the course of vaporization, dissolved gases in the produced water are liberated with the vapor. The vapor and the liberated dissolved gases (NCG) are vented from the deaerator 56, leaving residual produced water. The residual produced water is substantially free of dissolved gases and is directed into the evaporator 34 where the produced water is subjected to an evaporation process described above.

Those skilled in the art appreciate that the temperatures and pressures discussed above can be controlled in various ways. In the case of temperature for example, the temperature of the produced water immediately upstream of the pressure control valve 54 can be controlled by varying the flow rate of produced water through the one or more preheaters and/or varying the flow rate of the heating medium (working fluid) directed through the one or more preheaters. In any event, a typical control scheme might entail sensing the temperature after heating and comparing the sensed temperature with a set point temperature. Based on the difference between the sensed temperature and the set point temperature, a controller is employed to control various flow rates of the produced water and the heating medium through the one or more preheaters in order to control the temperature of the produced water.

Figure 4:
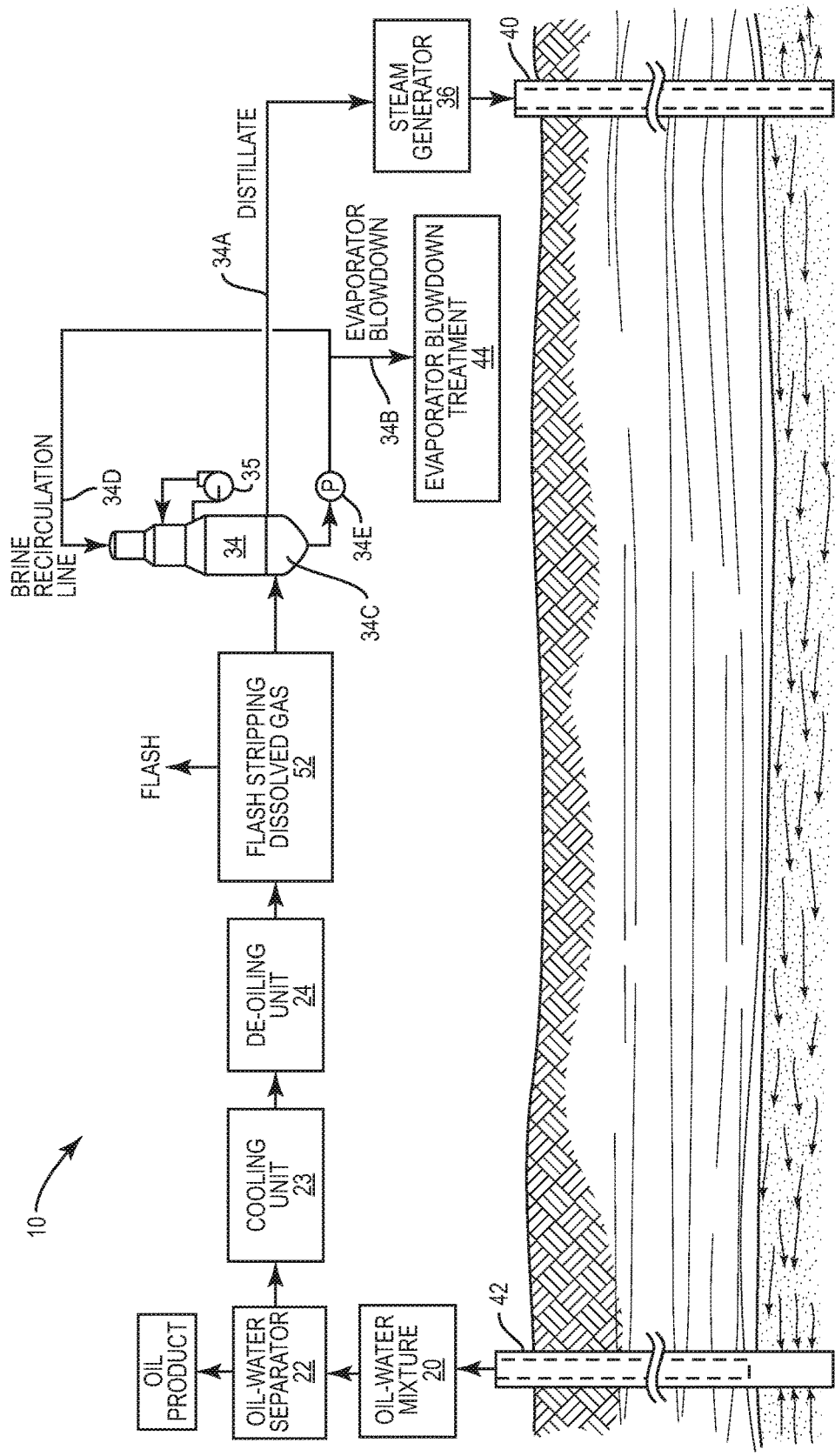
FIG. 4 is a schematic illustration of an oil recovery process that employs a high temperature option for flash vaporizing dissolved gases from the produced water.

FIG. 4 is an alternative embodiment of the present invention. In the FIG. 4 process there is shown an oil recovery process where dissolved gases are flashed from produced water in a flash stripping unit 52 such as a deaerator or flash vessel. The process shown in FIG. 4 is referred to as a high temperature option. This is because the produced water, after being separated from the oil-water mixture, is only moderately cooled. In the process described in FIG. 1, the produced water was cooled to a temperature of approximately 85° C. In the FIG. 4, high temperature option, the produced water is, in one embodiment, only cooled down to approximately 120° C. Thus, in the FIG. 4 embodiment there is no need for the conditioning or heating unit 50 described relative to the FIG. 1 process. This is because the temperature can be maintained relatively high with respect to the saturation temperature in the deaerator or flash vessel 52 without heating the produced water. In the exemplary embodiment of FIG. 4, the temperature of the produced water just upstream of the deaerator or flashing vessel 52 is approximately 120° C. When the produced water enters the deaerator or flashing vessel 52, a portion of the produced water will flash, resulting in dissolved gases being vented from the deaerator or flash vessel 52. This is because the deaerator or flash vessel 52 is operated at approximately 100° C. Thus, the produced water leaving the deaerator or flash vessel 52 and directed to the evaporator 34 will have a temperature of approximately 100° C.

Figure 5:
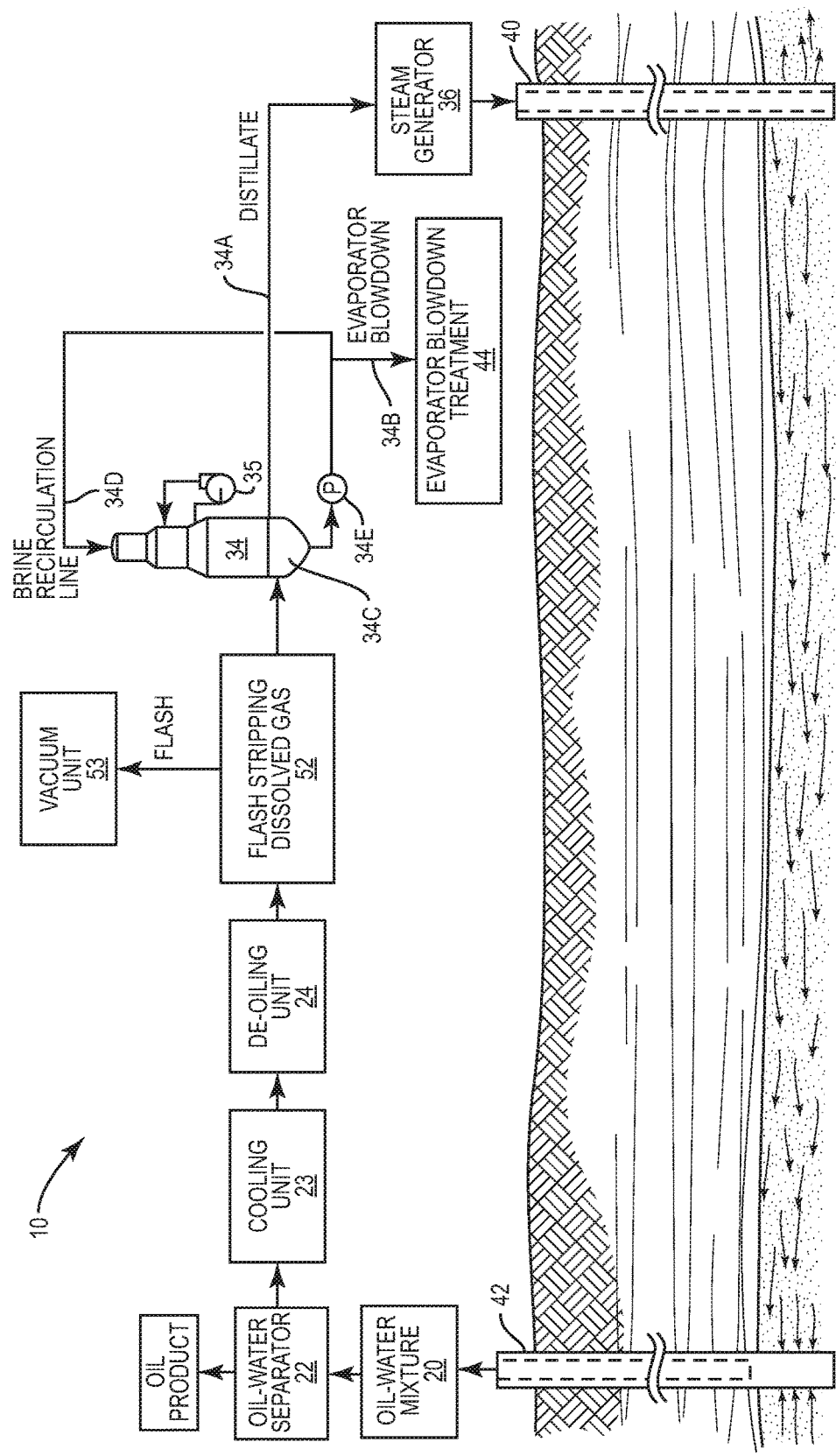
FIG. 5 is a schematic illustration for an oil recovery process that employs a vacuum unit to remove dissolved gases from the produced water.

Turning to FIG. 5, another alternative embodiment is shown for treating produced water including removing dissolved gases from the produced water before reaching evaporator 34. In this exemplary embodiment, a vacuum unit 53 is used to remove dissolved gases from the produced water passing through the dissolved gas stripping unit 52. Here the produced water is cooled to approximately 85° C. before entering the de-oiling unit 24. Since a vacuum unit 53 is being used, there is no requirement that the produced water be heated upstream of the dissolved gas stripping unit 52. Thus, the produced water entering the dissolved gas stripping unit 52, in one embodiment, is at a temperature of approximately 85° C. and the unit 52 operates at less than 85° C. to yield conditions that enable the vacuum unit 53 to efficiently remove dissolved gases from the produced water. Therefore, produced water leaving the dissolved gas stripping unit 52 after being subjected to the vacuum created by the vacuum unit 53 is at a temperature less than 85° C. in this particular example. It is appreciated that these temperatures can vary depending on field conditions and the objectives of pre-treating the produced water prior to reaching the evaporator 34.

There are numerous advantages of the present invention. First, dissolved gases are removed from produced water without requiring conventional steam stripping where steam directly contacts the produced water. In the present processes, heat energy required to liberate dissolved gases is provided through heat transfer over a surface exchanger. Further, the temperatures and pressures required of the produced water are easily controlled such that efficient use is made of the supplied energy. Sufficient energy can be supplied through indirect heating to remove dissolved gases from the produced water to an appropriate and acceptable level.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of recovering oil from an oil well comprising:
 a. removing an oil-water mixture from the well;
 b. separating oil from the oil-water mixture to produce oil and produced water having dissolved gases;
 c. directing the produced water into a deaerator;
 d. after directing the produced water into the deaerator, directing the produced water to an evaporator and evaporating at least a portion of the produced water and producing a concentrated brine and steam;
 e. condensing the steam to form a distillate;
 f. directing the distillate to a steam generator and heating the distillate in the steam generator to produce steam;
 g. injecting the steam into an injection well;
 h. increasing or maintaining the temperature of the produced water upstream of the deaerator such that the temperature of the produced water upstream of the deaerator exceeds the saturation temperature of the produced water in the deaerator; and
 i. flashing a portion of the produced water in the deaerator to remove dissolved gases from the produced water.

2. The method of claim 1 including increasing the temperature and pressure of the produced water upstream of the deaerator by directing the produced water through at least one heater.

3. The method of claim 1 including increasing the temperature of the produced water upstream of the deaerator by directing the produced water through two heaters disposed in series.

4. The method of claim 1 including indirectly heating the produced water upstream of the deaerator to a temperature above 100° C. and maintaining the pressure of the produced water at a pressure that prevents the produced water from boiling; and thereafter lowering the pressure of the produced water causing the produced water to be flash vaporized to form vapor and residual produced water; and wherein the dissolved gases in the produced water are liberated and vented from the deaerator along with the vapor.

5. The method of claim 1 including heating the produced water upstream of the evaporator to a temperature of 110° C. or higher.

6. The method of claim 5 including indirectly heating the produced water upstream of the evaporator by utilizing live steam or glycol.

7. The method of claim 1 including indirectly heating the produced water in a heater upstream of the deaerator, and employing a pressure control valve in a line interconnecting the heater with the deaerator to control the pressure of the produced water upstream of the valve.

8. The method of claim 7 wherein the valve functions to cause a relatively low pressure to exist in the deaerator and wherein the method includes flash vaporizing the produced water in the deaerator to liberate dissolved gases.

9. The method of claim 1 further including:
indirectly heating the produced water upstream of the deaerator to a temperature exceeding 100° C.;
utilizing the control valve to maintain the pressure in the deaerator at a pressure below the pressure of the produced water upstream of the deaerator;
directing the produced water through the control valve and into the deaerator; and
flash vaporizing the produced water in the deaerator to remove dissolved gases from the produced water.

10. The method of claim 1 including indirectly heating the produced water in at least one heat exchanger disposed upstream of the deaerator by directing a heating medium into and through the heat exchanger.

11. The method of claim 10 wherein the heating medium is not produced by the evaporator.

12. A method of recovering oil from an oil well comprising:
(a) removing an oil-water mixture from the well;
(b) separating oil from the oil-water mixture to produce oil and produced water;
(c) indirectly heating the produced water to a temperature of 100° C. or higher;
(d) after heating the produced water to a temperature greater than 100° C., directing the produced water into a deaerator;
(e) flash vaporizing the produced water in the deaerator to produce vapor and residual produced water and wherein flash vaporizing the produced water causes dissolved gases to be liberated from the produced water;
(f) venting the dissolved gases and vapor from the deaerator;
(g) directing the residual produced water to an evaporator and evaporating at least a portion of the residual produced water to produce a concentrated brine and steam;
(h) condensing the steam to form a distillate;
directing the distillate to a steam generator and heating the distillate in the steam generator to produce steam; and
(j) injecting the steam into an injection well.

13. The method of claim 12 including pressurizing the produced water upstream of the deaerator.

14. The method of claim 13 including maintaining the pressure of the produced water upstream of the evaporator higher than the pressure of the produced water in the deaerator.

15. The method of claim 12 including heating the produced water in a heater and directing the produced water through a pressure control valve disposed between the heater and the deaerator wherein the pressure control valve maintains the pressure of the produced water in the deaerator at a pressure lower than the pressure of the produced water upstream of the deaerator.

16. The method of claim 12 wherein there is provided a pressure control valve upstream of the deaerator that maintains the deaerator at a relatively low pressure compared to the pressure upstream of the pressure control valve.

17. The method of claim 12 including directing the produced water through first and second heat exchangers upstream of the deaerator and directing the distillate through at least one of the heat exchangers and directing a heated medium through the at least one heat exchanger.

18. The method of claim 12 including heating the produced water to a temperature of 110° C. or greater upstream of the deaerator and maintaining the temperature of the produced water upstream of the deaerator at a temperature greater than the saturation temperature of the produced water in the deaerator.

19. The method of claim 12 including directing the produced water through one or more heat exchangers and heating the produced water to a temperature of 100° C. or greater; directing the heated produced water through a pressure control valve that controls the pressure in the deaerator to a pressure less than the pressure of the produced water upstream of the deaerator such that the produced water is vaporized in the deaerator that is located downstream of the pressure control valve.

20. A method of recovering oil from an oil well, comprising:
(a) removing an oil-water mixture from the oil well;
(b) separating oil from the oil-water mixture to produce oil and produced water;
(c) directing the produced water to a flash stripping unit;
(d) controlling the temperature of the produced water upstream of the flash stripping unit such that upon entering the flash stripping unit the produced water flashes, producing vapor, liberated dissolved gases and residual produced water;
(e) directing the residual produced water to an evaporator and evaporating at least a portion of the residual produced water to produce a concentrated brine and steam;
(f) condensing the steam to form a distillate;
(g) directing the distillate to a steam generator and heating the distillate in the steam generator to produce steam; and
(h) injecting the steam into an injection well.

* * * * *